Dec. 23, 1969  E. S. DOERMAN  3,485,084
APPARATUS FOR TESTING CIGARETTE WRAPPERS
Filed June 5, 1967  6 Sheets-Sheet 1

Dec. 23, 1969  E. S. DOERMAN  3,485,084
APPARATUS FOR TESTING CIGARETTE WRAPPERS

Filed June 5, 1967  6 Sheets-Sheet 4

Dec. 23, 1969    E. S. DOERMAN    3,485,084
APPARATUS FOR TESTING CIGARETTE WRAPPERS
Filed June 5, 1967    6 Sheets-Sheet 5

Inventor
Eryka Stefan Doerman
By:
Watson, Cole, Grindle & Watson
Attorneys

United States Patent Office 3,485,084
Patented Dec. 23, 1969

3,485,084
APPARATUS FOR TESTING CIGARETTE
WRAPPERS
Eryk Stefan Doerman, London, England, assignor to
Molins Machine Company Limited, London, England,
a corporation of Great Britain
Filed June 5, 1967, Ser. No. 643,571
Claims priority, application Great Britain, June 7, 1966,
25,290/66
Int. Cl. G01m 3/04
U.S. Cl. 73—45.1                                    43 Claims

ABSTRACT OF THE DISCLOSURE

An apparatus and method is disclosed for testing cigarettes for air leaks in their wrappings by mounting them on a drum between pairs of pivoted end caps and rotating the drum through a suction chamber. A pressure responsive device is connected successively to the interior of each cigarette in the chamber and faulty cigarettes are rejected according to their internal air pressure. The caps are shaped to accommodate tolerances in the cigarette diameters and do not seal on the cigarettes but always allow some, restricted, air flow.

BACKGROUND OF THE INVENTION

Field of the invention

This invention relates to the testing of cigarettes and similar rod-like articles having an air-pervious filling and an open-ended wrapping for the filling, for leaks in the wrapping.

In the case of cigarettes such leaks can render them impossible or very unsatisfying to smoke. For very many years it has been the practice in the cigarette-manufacturing industry for each of the cigarettes coming off a cigarette-making machine to be inspected by an operator. With modern speeds of production of cigarettes, which are at the rate of several thousand per minute, it becomes desirable to replace this manual inspection with automatic testing apparatus which will receive a continuous high speed stream of cigarettes from a cigarette maker, test them, reject those that are unsatisfactory and pass the good ones on to be conveyed to packing machinery, and in recent times various proposals for the construction of such apparatus have been made.

Description of the prior art

U.S. patent specification No. 2,951,364 discloses one construction in which a continuous stream of cigarettes is carried on a conveyor to a testing station where they are tested one at a time by admitting air under pressure through one end of the cigarette to establish a higher pressure inside the cigarette than outside, and testing this pressure to see whether it is maintained or whether it leaks away through the wrapping. The air is admitted to each cigarette through a cap at one end of the cigarette and the other end is closed off by a cap having a hollow tube which communicates through the cap with the interior of the cigarette. On each tube a balloon is mounted and becomes inflated and extends horizontally, if the pressure is maintained in the cigarette, but is not inflated properly if air leaks out of the cigarette. A photo-electric cell detects the state of the balloon and causes faulty cigarettes to be rejected. The conveyor carries a plurality of pairs of these caps which are moved repeatedly along an endless path receiving cigarettes at one point, testing them, rejecting some and passing the others on.

In Molins' French patent specification No. 1,371,259 there is disclosed a construction of apparatus in which a pressure difference is established across the cigarette wrapping by applying suction outside the cigarette, the pressure within the cigarettes being measured to indicate any leaks. This is done by forming an individual testing chamber around each cigarette and applying suction to that chamber.

Neither of these proposals has proved wholly satisfactory for the reliable testing of cigarettes at the speeds of modern cigarette-making machinery. One of the reasons for this is the difficulties which arise in arranging to subject each article separately to a testing pressure.

Summary of the invention

It is an object of this invention to provide improvements in the testing of cigarettes and similar rod-like articles.

According to one aspect of the present invention there is provided apparatus for testing cigarettes and similar rod-like articles having an air-pervious filling and an open-ended wrapping for the filling comprising a testing-chamber, means to maintain an air pressure in the testing chamber at a level different from atmospheric pressure, a conveyor to carry the articles in succession through the testing chamber, means to restrict any flow of air between the testing chamber and the interiors of articles in the testing chamber through the open ends of the articles so that there is an air pressure difference across the wrapping of an article in the testing chamber, and a pressure-sensitive testing device to respond to the air pressure in each successive article in the testing chamber to indicate any flow of air through the wrapping of that article.

Preferably the means to restrict any air flow between the testing chamber and the interiors of articles in the testing chamber comprises a plurality of caps each of which is engageable over the end of an article partially to isolate the interior of the article from the exterior and the caps are carried on the conveyor to pass externally of the testing chamber as the articles are presented thereto. Preferably also the caps are formed to support the articles and are movable to grip and release the articles and the caps each have a first article-engaging part fixed to the conveyor and a second article-engaging part pivoted to the conveyor for inward and outward swinging movement to grip and release the articles respectively.

The caps can be shaped to accommodate some variation in the cross-sectional size of the articles.

In a modification caps are provided on one side of the conveyor to engage ends of the articles, and stops are provided at the other side of the conveyor to engage and close off the opposite ends of the articles, and preferably the cigarettes are carried on the conveyor with their filter ends held in the caps and their plain ends closed by the stops.

In a preferred embodiment the conveyor comprises a rotary drum having around its circumference a plurality of open cradles for the articles spaced at regular intervals around its periphery, and mechanical retainer means engaging the articles to hold them in the cradles between a pick-up point and a take-off point.

The apparatus can also comprise a fluted rejector drum whose flutes register in succession with those of the take-off drum at a reject position, means are provided to blow articles out from between a pair of registering flutes at said reject position in response to a reject signal from the testing device, and to control the supply of suction to the flutes of the take-off drum to allow endwise movement of an article to be rejected. In addition it may comprise a rotary fluted suction drum to pick the articles up from a horizontally moving incoming conveyor and deliver them to the testing drum.

With advantage rotation of the drum causes the caps to move into and out of an article-engaging position by means of cam followers, actuated as the drum rotates.

Preferably the pressure in the testing chamber is maintained below atmospheric pressure by suction means.

In another aspect of the invention there is provided apparatus for testing cigarettes and similar rod-like articles having an air-pervious filling and an open-ended wrapping for the filling comprising a conveyor for the articles, means to establish an air pressure difference across the wrappings of articles at a testing point on the conveyor, means to produce a test signal indicating any flow which occurs through the wrappings and ends closure members to embrace the wrappings around the open ends of articles on the conveyor to provide a barrier to the flow of air between the interior and the exterior of the articles through the ends and which are shaped to embrace articles of sizes which are various according to manufacturing tolerances without permanently deforming them and to allow limited air flow around the ends of the articles.

In a further aspect of the invention there is provided apparatus for testing cigarettes and similar rod-like articles having an air-pervious filling and on open-ended wrapping for the filling comprising a conveyor for the articles, means to establish an air pressure difference across the wrappings of an article at a testing point on the conveyor, means to produce a test signal indicating any flow which occurs through the wrappings and ends closure members carried by and movable relatively to the conveyor into and out of engagement with the articles to embrace the wrapping around the open ends of articles on the conveyor so as to support the articles without permanent deformation against movement in any direction.

The invention also provides a method of testing cigarettes and similar rod-like articles having an air-pervious filling and an open-ended wrapping for the filling comprising conveying each of the articles through a suction or pressure testing chamber in which the air pressure is maintained at a level different from atmospheric pressure, means being provided to restrict any flow of air between the testing chamber and the interiors of articles in the chamber through the open ends of the article so that there is an air pressure difference across the wrapping of an article in the testing chamber, and monitoring the air pressure in each articles whilst in the testing chamber to indicate any flow of air through the wrapping.

BRIEF DESCRIPTION OF THE DRAWING

Apparatus in accordance with the invention will now be described by way of example with reference to the accompanying drawings, in which.

DESCRIPTION OF THE PREFERRED EMBODIMENTS

Figure 1:
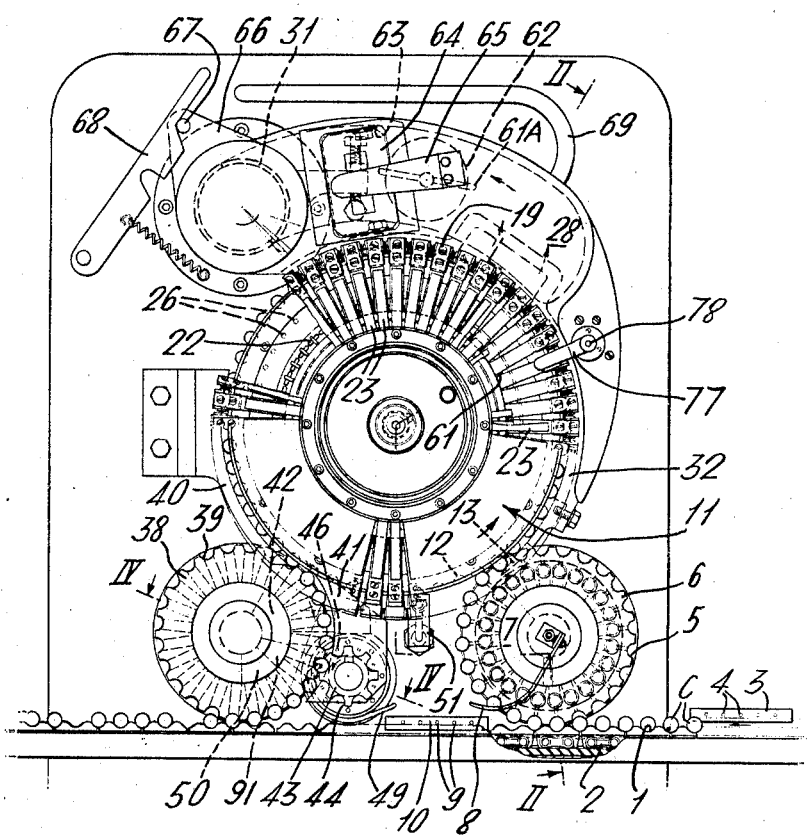
FIGURE 1 is a side elevation of apparatus for testing the wrappings of cigarettes.

Referring to the drawing, and initially to FIGURE 1, mouthpiece cigarettes C are conveyed transversely of their axes in succession in flutes 1 on a chain conveyor 2 which travels in the direciton shown by the arrow. Above and to one side of the chain conveyor 2 is a block 3 with holes 4 through which air is blown and which are located to blow axially from the conveyor 2 any cigarette which may have become improperly positioned thereon, and in particular which may have become lodged between two flutes 1 so as to rest on and between the two cigarettes carried in those flutes.

Figure 2:
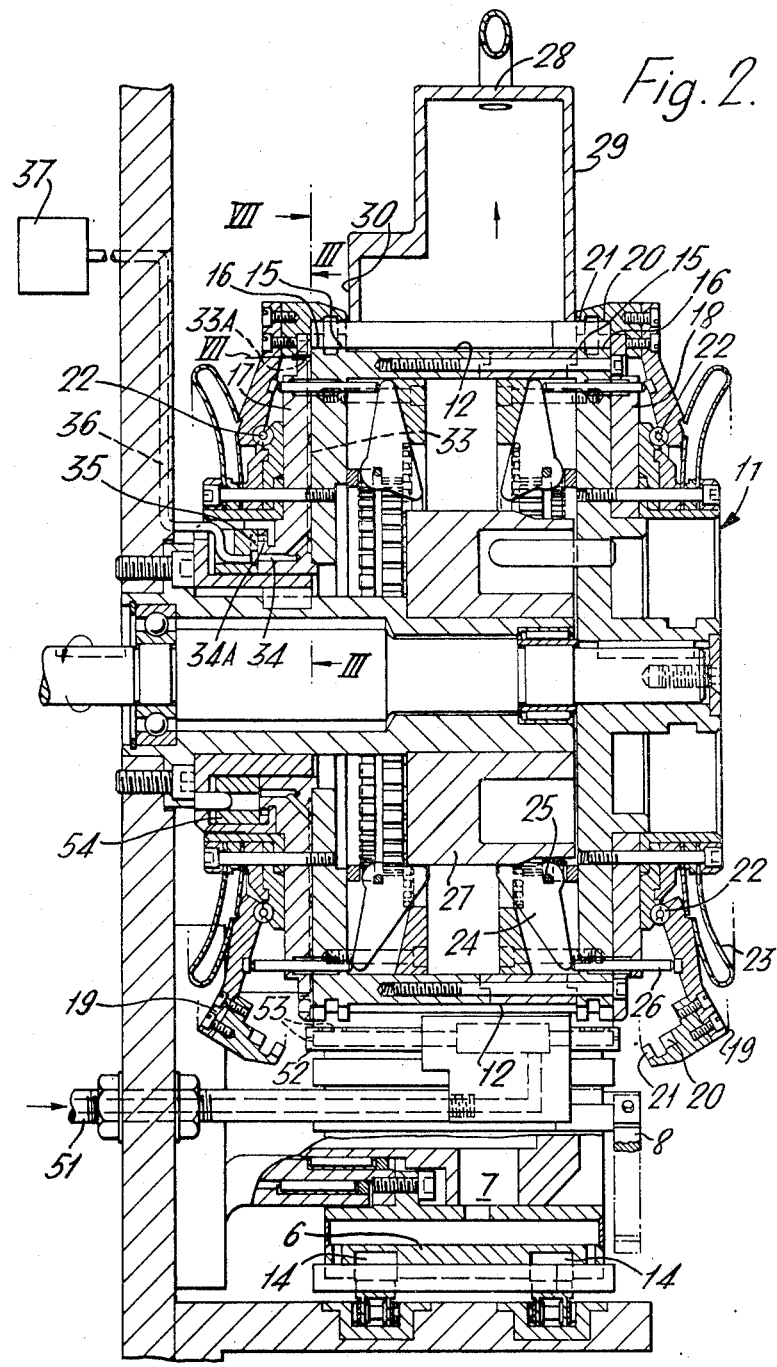
FIGURE 2 is a section on the line II—II of FIGURE 1.

The cigarettes C are received from the conveyor 1 in flutes 5 on a clockwise (as viewed in FIGURE 1) rotating suction drum 6, having an internal suction chamber 7 which communicates with the flutes 5 around that part of the drum's periphery where cigarettes are carried in the flutes. Associated with the drum 6 is a stationary stripper element 8 arranged as shown in FIGURES 1 and 2 at one side of the drum to strip from its flutes any cigarettes which may be axially misaligned in relation to the drum, i.e. any cigarettes positioned too far to the right as viewed in FIGURE 2. Such misaligned cigarettes are caused, by engagement with the element 8, to fall from the drum 6 back on the chain conveyor 1 from which they are blown axially by air jets coming from holes 9 in a block 10.

The cigarettes C retained in flutes 5 of drum 6 by suction are transferred therefrom to an endless conveyor in the form of a drum 11, having cradles 12 to receive the cigarettes and convey them transversely to their axes. Just before the point of transfer from drum 6 to drum 11 suction is cut off from the flutes 5 (by termination of the suction from chamber 7) and the transfer is assisted by stripper elements 13 which extend into annular grooves 14 (FIGURE 2) on the drum 6.

Each cradle 12 comprises a pair of half cups, one for each end of a cigarettte, defined by two generally semi-circular formers 15 and 16 and the side members 17 and 18 of the drum 11. The other halves of the cups are formed by pivotally mounted end caps 19 each of which also has a pair of generally semi-circular formers 20, 21 and is arranged to move so that these register with the formers 15, 16 to encircle the cigarettes at two points near each of its ends and to block the flow of air around the ends. The space between the formers communicates with atmosphere and provides a guard ring which separates the end of the cigarette from a suction chamber to be described.

Figures 6, 7:
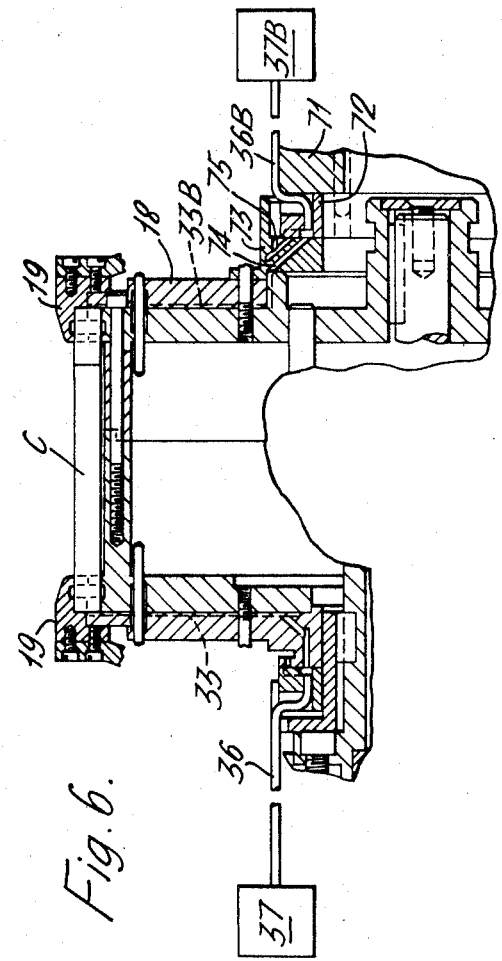
FIGURE 6 is a view similar to FIGURE 2 of a part of another modification.
FIGURE 7 is a view on the line VII—VII of FIGURE 2.

In fact, as is shown in FIGURE 7, the shape of the formers is not a complete semi-circle but only a partial one. As a result they are able to receive the slightly different sizes of cigarette which are produced in manufacture and also they do not provide a complete seal against the flow of air round the ends of the the cigarettes.

The caps 19 are pivotally mounted on the drum 11 and are urged to swing inwardly about pivots 22 by springs 23. Cam followers 24, movable about pivots 25, can push on rod 26 which engage and swing the caps 19 outwardly about the pivots 22. The cam followers 24 run on a stationary cam 27 inside the drum 11, which is shaped so that a pair of caps 19 is held in its open position, i.e. the position shown at the lower part of FIGURE 2, as a cigarette is received in the cradle 12 with which the caps 19 are associated, and so that the caps 19 then move inwardly under the action of the springs 23 to their closed position, i.e. the position shown at the top of FIGURE 2, where they engage the cigarette in the manner described above.

Extending around part of the periphery of the drum 11 is a stationary open-sided suction chamber 28 having side walls 29 and 30 arranged closely adjacent the peripheries of the cigarettes carried on the drum, and spaced apart, as shown in FIGURE 2, to lie closely adjacent the ends of the caps 19 when the latter are in their closed position. The open side of the suction chamber between the walls 29 and 30 thus extends across the periphery of a cigarette between the formers 15. Suction is continuously applied through a pipe 31 to the chamber 28 and thus suction is applied to the space round the cigarettes carried on the drum 11 as the cigarettes travel under the suction chamber. The walls of the suction chamber 28 are extended to provide a guide 32 which acts to hold the cigarettes in the cradles 12 of drum 11 after they are transferred to the drum, the stripper elements 13 being formed by projections on the guide 32.

A butterfly valve 61A is mounted in the suction chamber 28 and is controlled by an electromagnet 62 to close off the suction when the testing apparatus is stopped and the drum 11 comes to rest for any reason. If no provision is made to cut the suction off, air would be continuously drawn over the same group of cigarettes and, since it is not filtered, might discolour them by depositing dust on them. It is not sufficient to turn off the fan supplying the suction as this takes too long to slow down and stop.

The suction in the chamber 28 is supplied from a fan used exclusively for this purpose so that the pressure in the chamber 28 can be kept reasonably constant. A separate fan is used for supplying suction to other parts of the apparatus.

A net 63 of expanded metal is provided to trap bits and pieces of paper and tobacco from damaged cigarettes or parts of cigarettes that get drawn into the suction chamber. The net 63 can be emptied by an operator by removing the cover 64 which is held in place by a spring clip 65.

The suction chamber 28 is mounted to be pivotable about the pipe 31 to provide access to the testing drum for maintenance and to enable the spacing from the drum to be adjusted. A tongue 66 pivots with the chamber 28 and carries a locking pin 67 which is engaged in recesses in a spring-loaded pivoted locking arm 68 to secure the chamber 28 in the open position. A pressure detector device (not shown) is connected to the suction chamber 28 by a pipe 69 to respond to any substantial increase in the pressure in the chamber 28 to prevent a rejector device, (to be described) and a rejected-cigarette counter from operating. This is actuated when several cigarettes are missing from the drum 11 or when the drum is being run for testing purposes without any cigarettes. In the latter case the rejector device could be overstrained.

A feeler 77 is mounted on a pivot shaft 78 and positioned close to the periphery of the drum 11 at the approach to the suction chamber 28 so as to be struck by any of the caps 19 on the outer side of the drum 11 which is jammed open by a misaligned cigarette which could foul the mechanism. The consequent rotation of feeler shaft 78 actuates a mechanism which stops the rotation of the drum 11 before such a cigarette can do any damage.

Figure 3:
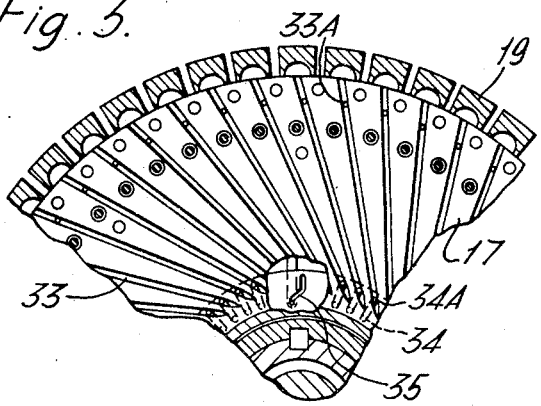
FIGURE 3 is a section on the line III—III of FIGURE 2.

The end member 17 of the drum 11 has, as shown in FIGURE 3, grooves 33, one associated with each cradle 12. Each groove 33 communicates at one end with a small recess immediately adjacent the end face of the cigarette carried in the respective cradle 12, and at the other end with a hole 34 leading to the left hand face (as viewed in FIGURE 2) of the end member 17. The end member 17 lies against the main body portion of drum 11 and these grooves 33 thus provide passageways between the left-hand end face (as viewed in FIGURE 2) of each cigarette carried in a cradle 12, and the holes 34.

The holes 34 can communicate with a small stationary slot 35 which is connected by a pipe 36 to a suction transducer 37 which detects a pressure change and converts it to an electric signal. In addition a bleed hole 33A is provided in each groove 33 to damp the response of the detection device. The slot 35 is positioned and dimensioned so that each hole 34 in turn comes, as drum 11 rotates, into register with it and in this way one end (the left-hand end as viewed in FIGURE 2) of each cigarette in turn carried on drum 11 comes into communication with the detecting device 37.

There is also provided in a projection of the side member 17 a hole 34A which communicates with atmosphere and which moves into register with the slot 35 after the hole 34 has moved out of register with the slot.

As the cigarettes pass through the suction chamber 28 the pressure difference across the wrapping causes some air to flow through the wrapping since this is, even for a good cigarette, slightly porous. This reduces the pressure inside the cigarette and this reduced pressure is detected by the suction transducer 37. Because of the slight gap between the cigarette and the formers which encircle it and of the porosity of the cigarette paper which comprises the wrapping there is some flow of air through the recesses at the ends of every cigarette passing through the chamber and a consequent reduction in pressure at the suction transducer.

When a cigarette which has a leaky wrapping, arising from perforations in the wrapping, or from badly made joints, or just from an excessive porosity of the cigarette paper, passes into the suction chamber 28, the airflow is greater and the suction tranducer generates a higher current. Cigarettes giving rise to an excessive air flow are rejected in response to the current generated by the suction transducer in a manner to be described.

Figure 9:
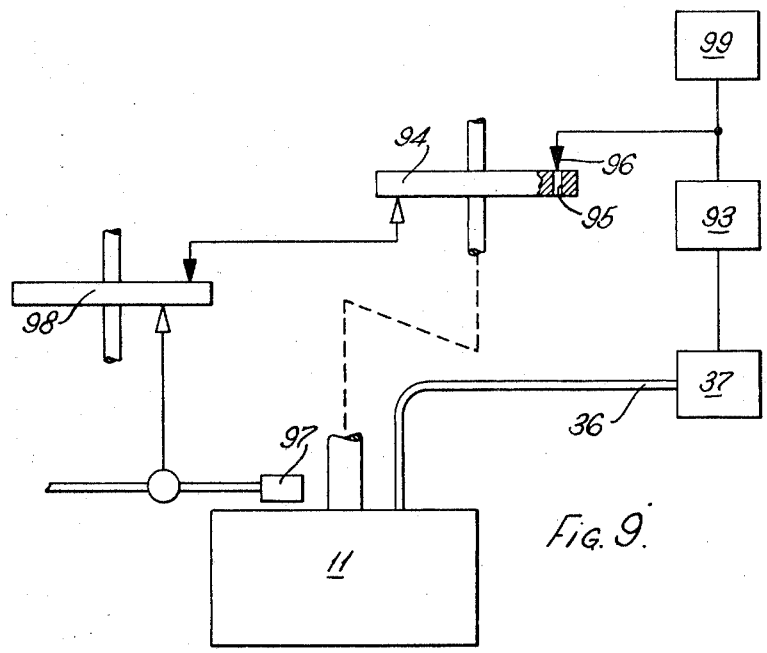
FIGURE 9 is a schematic view of the apparatus.

As is shown in FIG. 9, the signal from the suction transducer is amplified at 93 and fed to a memory device which comprises a disc 94 having several hundred magnetic pins 95 around its periphery and which is rotated so that the pins move in step with the cigarettes. The pins 95 are magnetised by a recording head 96 either one way or the other depending upon whether the signal from the suction transducer 37 for the corresponding cigarette is above or below a certain value. If the cigarette is satisfactory, the signal from the suction transducer 37 is below the value and the corresponding pin is magnetised one way and the cigarette allowed to continue in the production stream, whereas if the cigarette is faulty, a high airflow through its wrapping occur, a high signal is generated by the suction transducer and the corresponding pin is magnetised the other way. As a result the rejector 97 is operated by a signal received from the memory when the cigarette is in line with the rejector. The details of the construction of a suitable form of memory disc are shown in copending U.S. patent application Ser. No. 715,446, filed Mar. 22, 1968, by Douglas W. B. Muir.

A timing disc having a small number of magnetisable pins is rotated to be accurately synchronised with the movement of the cigarettes and the reject signals are fed from the memory disc to the rejector through the timing disc.

A counting device 99 is connected to record the number of "reject" signals.

Immediately after a cigarette has been tested in this manner the hole 34 associated with the cradle 12 carrying the cigarette moves out of register with the slot 35 and the hole 34A then moves into register with the slot to permit air to flow into the slot 35 and restore normal pressure in readiness for testing the next cigarette.

The cigarettes, having been tested as described above, continue their travel on the continuously rotating drum 11, and as they approach a point at which they are transferred from the drum 11 to a suction drum 38 with flutes 39, the caps 19 are moved outwardly by the action of cam 27 to their open position, a guide 40 being mounted adjacent the drum 11 to retain the cigarettes in the locations 12. The drum 38 rotates clockwise as viewed in FIGURE 1 and at the termination of guide 40 the cigarettes are transferred from the cradles 12 of drum 11 to the flutes 39 of drum 38, the transfer being assisted by stripper guides 41 arranged adjacent and to either side of the drum 38. Suction is applied to the flutes 39 from an arcuate suction chamber 42 inside the drum 38 (FIGURE 1).

Figure 4:
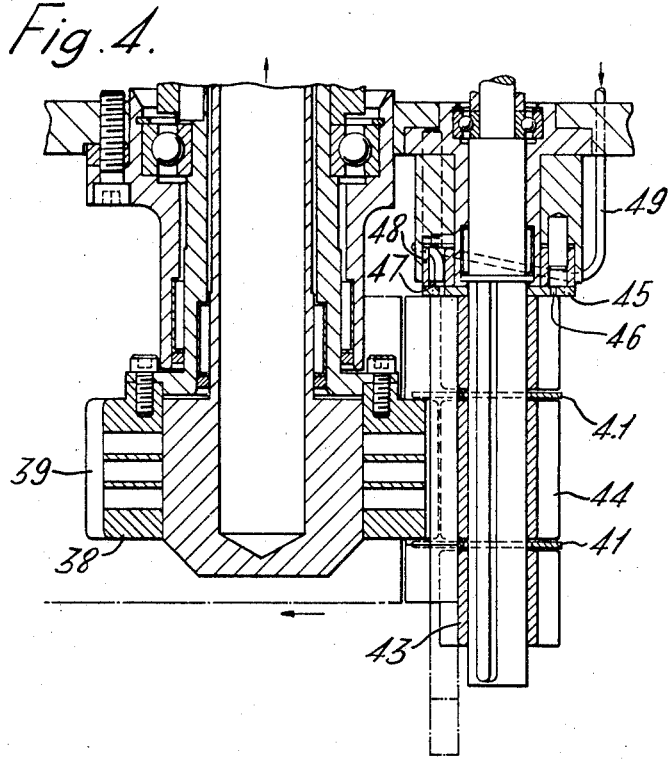
FIGURE 4 is a section on the line IV—IV of FIGURE 1.

The rejector comprises a rejector drum 43 having flutes 44 and rotated anti-clockwise as viewed in FIGURE 1, and is positioned adjacent the drum 38 and arranged so that as the drums rotate the flutes 44 register with the flutes 39. The rejector drum 43 has an end plate 45 (FIGURE 4) containing holes 46 arranged one in line with each flute 44 and, as shown in FIGURE 4, at the position where a flute 44 registers with a flute 39 the hole 46 registers with an opening 47 in a stationary member 48. A pipe 49, through which air can be blown, connects with the opening 47 so that an air jet can be directed through the hole 46 and along the flute 44. Air is fed to the pipe 49 through a flexible tube (not shown) which extends between the jaws of a clamp which is electromagnetically operated in response to reject signals to open allowing air to flow in the tube, being normally closed and cutting off any air flow in the tube. Air is blown through the pipe 49 responsively to the operation of the suction transducer 37 and in timed realtionship with the operation of the apparatus in such a way that when a cigarette which the suction transducer 37 has found to be faulty reaches the position where a flute 44 registers with the flute 39 carrying the cigarette, an air jet is directed through the hole 46 against the end face of the cigarette, causing the cigarette to be blown out axially from the registering flutes 44 and 39. At the position where the flutes 44 and 39 register, suction is cut off from the flute 39 as the flute 39 passes over land 91 between suction chambers 42 and 50, so that the cigarette is free to be blown axially from the flutes if it has been found faulty. These rejected cigarettes may be collected and counted if desired.

Cigarettes not so rejected remain in the flutes 39, held initially by the guides 41 and subsequently by suction applied to the flutes 39 from a further suction chamber 50 inside the drum 38. These cigarettes are then deposited from the drum 38 back into the flutes 1 on the chain conveyor 2, suction being cut off (by termination of the suction from chamber 50) from the flutes 39 at the depositing position.

Associated with the drum 11, at a position between that at which it transfers cigarettes to the drum 38 and that at which it receives cigarettes from the drum 6, is an air pipe 51 which communicates (see FIGURE 2) with a hollow cylinder 52 having holes 53 in its end faces and its cylindrical walls positioned to direct jets of air into the end parts of the cradles 12 and against the cigarette-engaging portions of the caps 19. Air is continuously blown through the pipe 51 so as to blow away from the cradle 12 and caps 19 small particles of tobacco which may have collected there. Air is also blown through the grooves 33 from an air pressure supply via a pipe carried in part 54.

Figure 5:
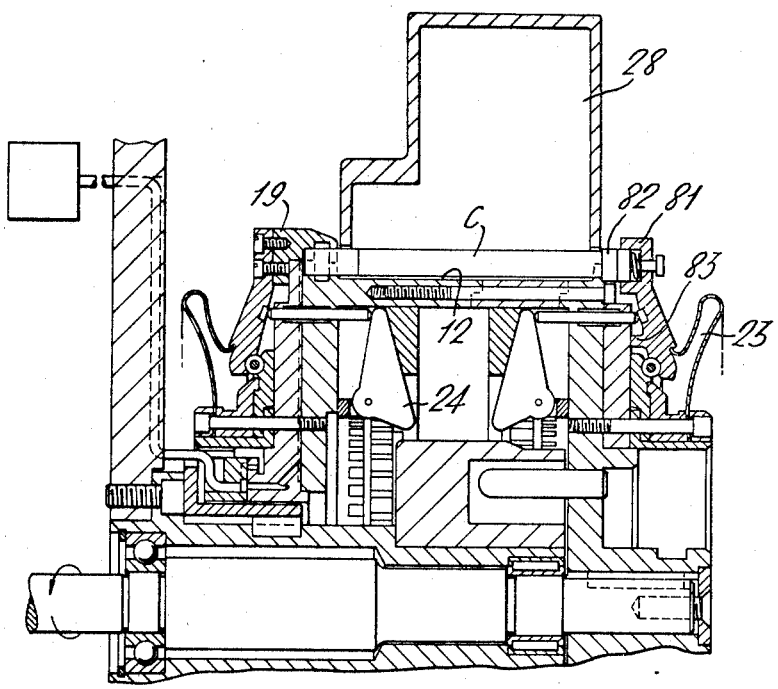
FIGURE 5 is a view similar to FIGURE 2 of a part of one modification of the apparatus.

FIGURE 5 shows an alternative arrangement in which each of the outermost end caps 19 is replaced by a plunger head 81 carrying a resilient plunger pad 82 which is spring-loaded to engage and more or less to close off the plain end of a cigarette C carried in a cradle 12. A stop 83 is provided on the pivoted arm which carries the plunger head 81 to limit the movement of the arm to avoid damaging the cigarette. In addition the cradle 12 is modified at that end to eliminate the former 15 and the outer wall of the suction chamber 28 is positioned adjacent the end of the cigarette. Also the shape of the springs 23 has been modified to give them a better action.

This arrangement enables more of the length of the cigarette to be tested, the one end cap 19 being sufficient to hold the cigarette in position in the cradle 12.

In practice it is found that the sensitivity of the response of the test is related to the distance of the fault from the suction transducer. Thus an improved result can be obtained by arranging for the pressure at each end of the cigarette to be measured. FIGURE 6 shows a way of arranging for the provision of a second suction transducer 37B to detect the pressure at the other end of the cigarette. This second transducer 37B is mounted on an outrigger 71 connected to the frame of the apparatus and carrying a stationary valve piece 72 to which the suction transducer 37B is connected by a passage 36B. The drum 11 is provided with a further set of passages 33B and a moving valve block 73 having passages 74 and 75 communicating with the passages 33B and atmosphere respectively. The moving valve block 73 and the stationary valve piece 72 co-operate to bring the second transducer 37B into communication alternately with one end of cigarettes C in the suction chamber 28, and with atmosphere, at the same time, as, and in the same way as the first suction transducer 37 is connected to the other ends of the cigarettes. The two signals can then be combined and treated as though they were one.

Figure 8:
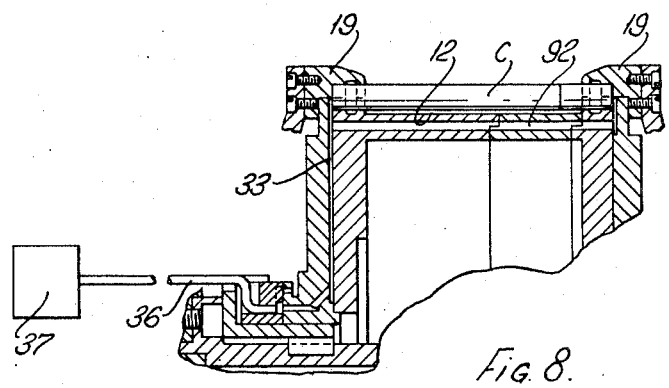
FIGURE 8 is a view similar to FIGURE 2 of a part of another modification.

An alternative way of improving the response when only the one transducer 37 is being used is to connect the transducer to both ends of the cigarettes by connecting the recesses in each cradle 12 together by a passage 92 in the body of the drum 11 just beneath each cradle as is shown in FIGURE 8.

What I claim as my invention and desire to secure by Letters Patent is:

1. Apparatus for testing cigarettes and similar rod-like articles having an air-pervious filling and an open-ended wrapping for the filling comprising a testing chamber, means to maintain an air pressure in the testing chamber at a level different from atmospheric pressure, a conveyor for the articles, means to restrict any flow of air between the testing chamber and the interior of an article in the testing chamber through the open ends of the article so that there is an air pressure difference across the wrapping of the article in the testing chamber, and a pressure sensitive testing device to respond to the air pressure in the article in the testing chamber to indicate any flow of air through the wrapping of that article wherein the testing chamber and the conveyor are arranged for the conveyor to carry each of the articles in succession through the testing chamber, the testing device being arranged to respond to the air pressure in each successive article.

2. Apparatus according to claim 1 wherein the chamber is defined partly by fixed walls and partly by the conveyor and the articles carried thereon.

3. Apparatus according to claim 1 having means responsive to stopping of the conveyor to cause the pressure in the testing chamber to become atmospheric.

4. Apparatus according to claim 1 comprising means responsive to the pressure in the testing chamber to indicate the absence of articles from the conveyor.

5. Apparatus according to claim 4 comprising a rejector to reject articles regarded as faulty from a stream of tested articles in response to a signal generated by the testing device and means to count the number of cigarettes rejected wherein the means responsive to the pressure in the testing chamber to indicate the absence of articles from the conveyor acts to prevent the rejector device operating.

6. Apparatus according to claim 1 wherein the means to restrict any air flow between the testing chamber and the interiors of articles in the testing chamber comprises a plurality of caps each of which is movable to a position over the end of an article to separate the interior of the article from the exterior, said caps being positioned on the conveyor to pass externally of the testing chamber as the articles are presented thereto.

7. Apparatus according to claim 6 wherein the caps are formed to support the articles and each have a first article-engaging part fixed to the conveyor and a second article-engaging part pivoted to the conveyor for inward and outward swinging movement to embrace and release the articles respectively.

8. Apparatus according to claim 6 wherein the parts of each cap are shaped and arranged to define a chamber communicating with the end of the embraced article, and there is provided fluid passage means opening into said chamber to provide communciation with the testing device.

9. Apparatus according to claim 6 wherein the caps are shaped to accommodate some variation in the cross-sectional size of the articles.

10. Apparatus according to claim 6 wherein each cap is formed to define two restrictions in the air flow path between the interior and the exterior of the wrapping and an air guard ring between the two restrictions.

11. Apparatus according to claim 6 wherein the caps are arranged on the conveyor in pairs, one for each end of each article and wherein fluid passage means are provided in each cap for connecting the interior of the articles with the testing device and in the conveyor to connect the passages of each pair of caps one to the other.

12. Apparatus according to claim 6 wherein the caps are arranged on the conveyor in pairs, one for each end of each article, and fluid passage means are provided in one cap of each pair for connecting the interior of the articles with the said testing device and wherein a further testing device is provided and each pair of caps communicates one to each testing device.

13. Apparatus according to claim 6 wherein caps are provided on one side of the conveyor to engage ends of the article and stops are provided at the other side of the conveyor to engage and close off the opposite ends of the articles.

14. Apparatus according to claim 13 wherein the stops comprise resiliently urged resilient pads mounted on the conveyor for pivotal movement towards and away from the ends of the articles on one side of the conveyor and means are provided to support the ends of the articles on that side of the conveyor.

15. Apparatus according to claim 13 for testing filter cigarettes wherein the cigarettes are carried on the conveyor with their filter ends held in the caps and their plain ends closed by the stops.

16. Apparatus according to claim 6 comprising means to detect a wrongly positioned cap and to stop the conveyor in response thereto.

17. Apparatus according to claim 16 wherein the detection means comprises a feeler adjacent the conveyor upstream of the testing chamber in a region where the caps are normally in a closed position and positioned to be struck by a cap which is in an open position.

18. Apparatus according to claim 6 comprising a rotary fluted suction drum to pick the articles up from a horizontally moving incoming conveyor and deliver them to the testing drum and means to remove axially misaligned articles from the flutes of said suction drum.

19. Apparatus according to claim 18 comprising means to produce a horizontal air curtain just above the horizontal conveyor to remove articles that are vertically misaligned on the horizontal conveyor.

20. Apparatus according to claim 18 comprising a horizontal outgoing conveyor substantially in line with the incoming conveyor wherein the incoming and outgoing conveyors are constituted by a single conveyor, and means are provided to remove debris or misaligned articles from the single conveyor between the pick-up and take-off drums.

21. Apparatus according to claim 1 wherein the conveyor comprises a rotary drum, a plurality of open cradles for the articles spaced at regular intervals around the circumference of the drum and mechanical retainer means engaging the articles to hold them in the cradles between a pick-up point and a take-off point.

22. Apparatus according to claim 21 wherein each cradle comprises a plurality of concavely curved thin supports spaced apart along the length of the articles.

23. Apparatus according to claim 21 wherein the mechanical retainer means comprises the end-engaging caps for a part of the travel of the drum between the pick-up and take-off points, and runners for the other part of the travel.

24. Apparatus according to claim 21 comprising a rotary fluted suction drum to take the articles from the testing drum, a fluted rejector drum whose flutes register in succession with those of the take-off drum at a reject position, air jet means to blow articles out from between a pair of registering flutes at said reject position in response to a reject signal from the testing device, and means to control the supply of suction to the flutes of the take-off drum to allow endwise movement of an article to be rejected.

25. Apparatus according to claim 24 wherein the rejector drum has a plurality of air holes disposed one to each flute and directed along the flutes, and arranged to register with the air jet means which is disposed at the reject position and which is selectively operable in response to a reject signal to blow air through the jets.

26. Apparatus according to claim 25 comprising a flexible tube in an air supply for the air jet means, a clamp to close the tube to stop the supply of air and electromagnet means operating the clamp to release it in response to the reject signal.

27. Apparatus according to claim 21 comprising a plurality of caps mounted on the conveyor, one to each end of each cradle for pivotal movement towards and away from the cradles to co-operate therewith to provide said means to restrict any air flow between the testing chamber and the interiors of articles in the testing chamber.

28. Apparatus according to claim 27 comprising a pivot arm carrying each cap, spring means to urge the caps into an article-engaging position, push rods mounted for sliding movement in the drum to engage the pivot arms and move them against the spring, cam followers mounted for pivotal movement inside the drum to actuate the push rods and a cam to actuate the cam followers on rotation of the conveyor drum.

29. Apparatus according to claim 21 comprising means to connect the testing device alternately with articles in the testing chamber and with atmosphere said means comprising a moving valve piece carried with the drum, a fixed valve piece having a port connected to the testing device, an air passage for each cradle to connect an article therein with the moving valve piece the fixed and moving valve pieces communicating across an interface to connect the cradles sequentially with the testing device as the drum rotates.

30. Apparatus according to claim 29 wherein the moving valve piece has a plurality of exhaust passages, one to each air passage, each opening to atmosphere and to the valve interface.

31. Apparatus according to claim 29 wherein each air passage connecting the cradle to the moving valve piece has a bleed hole to atmosphere.

32. Apparatus according to claim 21 wherein the testing chamber comprises a cowl opening to a part of the periphery of the drum, restricted communication to atmosphere being made between the periphery of the cowl and the surface of the drum around the articles supported on the drum so that during testing there is a continuous air flow through the testing chamber between atmosphere and the means to maintain the testing chamber pressure at a level different from atmosphere.

33. Apparatus according to claim 1 wherein the pressure in the testing chamber is maintained below atmospheric pressure by suction means.

34. Apparatus according to claim 33 and including a first suction fan to provide suction for use in manipulating the articles during their travel to or from the testing conveyor and wherein the said suction means comprises a second suction fan.

35. Apparatus according to claim 1 comprising a rejector to divert articles regarded as faulty from a stream of the articles which have been tested in response to a signal generated by the testing device, a memory device to store testing information during the travel of the articles from the testing chamber to the rejector and a timing device to synchronise the operation of the rejector with the positions of the articles.

36. Apparatus according to claim 1 wherein the testing chamber has restricted communication with atmosphere so that during testing there is a continuous air flow through the testing chamber between atmosphere and the means to maintain the pressure in the chamber at a level different from atmosphere.

37. Apparatus for testing cigarettes and similar rod-like articles having an air-pervious filling and an open-ended wrapping for the filling comprising a suction testing chamber, a rotary drum positioned for conveying the articles through the testing chamber, cradles spaced around its circumference to support the articles on the drum, caps on the drum movable to positions holding the articles in the cradles and shaped to co-operate with the cradles in said positions to define means restricting any flow of air between the testing chamber and the interiors of articles in the testing chamber through the open ends of the articles so that an air pressure differential may be maintained across the wrapping of an article in the testing chamber, and a pressure-sensitive testing device communicating with and responsive to the air pressure in each successive article in the testing chamber to indicate any flow of air through the wrapping of that article.

38. Apparatus for testing cigarettes and similar rod-like articles having an air-pervious filling and an open-ended wrapping for the filling comprising a conveyor for the articles, means to establish an air pressure difference across the wrapping of an article at a testing point on the conveyor, means to produce a test signal indicating any flow which occurs through the wrapping and end closure members carried by and movable relatively to the conveyor into and out of engagement with the articles in positions embracing the wrappings around the open ends of articles on the conveyor and supporting the articles without permanent deformation against movement in any direction, said end closure members having a first part fixed on the conveyor and shaped to provide support for the articles during transference to and from the conveyor and a second movable part pivoted to swing into engagement with an article supported on the first part.

39. A method of testing cigarettes and similar rod-like articles having an air-pervious filling and an open-ended wrapping for the filling comprising conveying all of the articles in turn through a common testing chamber in which the air pressure is maintained at a level different from atmospheric pressure, means being provided to restrict any flow of air between the testing chamber and the interiors of articles in the chamber through the open ends of the article so that there is an air pressure difference across the wrapping of an article in the testing chamber, and monitoring the air pressure in each article while in the testing chamber to indicate any flow of air through the wrapping.

40. A method according to claim 39 including rejecting unwanted articles according to the amount of air flow through the wrapping that is indicated.

41. Apparatus for testing cigarettes comprising an endless conveyor for moving a continuous stream of cigarettes transversely to their lengths, a series of end caps at intervals along the conveyor each of which is openable to receive or discharge a cigarette and each of which is formed to embrace a cigarette in the region of one of its ends, a suction chamber arranged in relation to the conveyor so that as the conveyor advances an area of the wrapping of each cigarette in turn is exposed to suction, pressure barrier means to restrain air flow between the other end of a cigarette and the suction chamber, and a pressure-sensitive test device, wherein each cap is positioned to pass outside the suction chamber and is formed to define with a cigarette an end chamber at the end of a cigarette to communicate with the interior thereof, a space around the cigarette and limited flow passages firstly between the zone to which suction is applied and said space and secondly between said space and the end chamber, and wherein said space is in communication with atmosphere and connecting means are provided to connect the end chamber with the testing device while a cigarette is exposed to suction thereby to produce a test signal related to airflow through the wall of the wrapping of a cigarette arising from the application of suction thereto.

42. Apparatus according to claim 41 further comprising means responsive to signals from the test device to reject unsatisfactory articles.

43. Apparatus according to claim 42 further comprising means alternately to connect the test device with each in turn of a sequence of the articles and with atmosphere.

References Cited

UNITED STATES PATENTS

| | | | |
|---|---|---|---|
| 3,258,117 | 6/1966 | Domeck et al. | 73—38 XR |
| 2,951,364 | 9/1960 | Sherrill | 73—45.2 |
| 3,237,444 | 3/1966 | Kaeding et al. | 73—45.1 |
| 3,266,295 | 8/1966 | Willamson | 73—38 |
| 3,270,551 | 9/1966 | Schmalz | 73—45.1 |
| 3,339,402 | 9/1967 | Rudszinat | 73—41 |
| 3,363,452 | 1/1968 | McArthur | 73—45.2 |

FOREIGN PATENTS

| | | |
|---|---|---|
| 267,711 | 1/1964 | Australia. |

LOUIS R. PRINCE, Primary Examiner

W. A. HENRY, II, Assistant Examiner